UNITED STATES PATENT OFFICE.

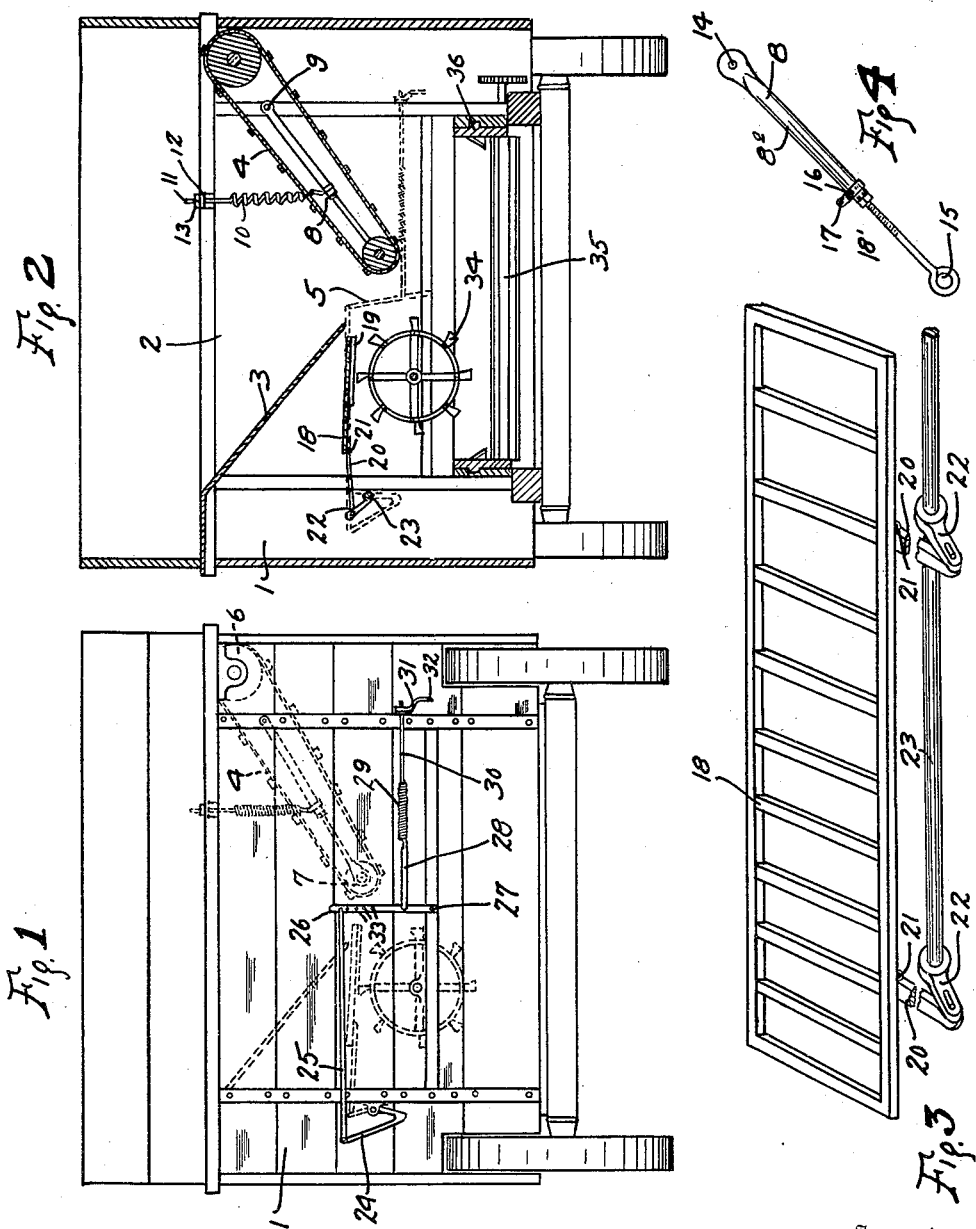

WILLIAM CLYDE LEONARD, OF WALLA WALLA, WASHINGTON, ASSIGNOR OF ONE-HALF TO A. F. BROCKMAN, OF BICKLETON, WASHINGTON.

AUTOMATIC FEEDER FOR GRAIN-SEPARATORS.

1,104,122. Specification of Letters Patent. Patented July 21, 1914.

Application filed October 2, 1913. Serial No. 792,998.

*To all whom it may concern:*

Be it known that I, WILLIAM CLYDE LEONARD, a citizen of the United States, residing at Walla Walla, in the county of Walla Walla and State of Washington, have invented new and useful Improvements in Automatic Feeders for Grain-Separators, of which the following is a specification.

My invention relates to improvements in feeders for grain separators and has as its principal object the design of a machine for the purpose mentioned which shall be entirely automatic in its action.

A further object of my invention resides in the particular arrangement and combination of parts hereinafter described.

In my prior patent for feeders for grain separators, numbered 1,067,355, granted to me July 15, 1913, I showed and described certain improved mechanism for feeding grain to separators, but it was necessary to adjust the mechanism of said prior patent by hand to accommodate it to material of different weights. On the contrary the mechanism shown and described in the present application automatically adjusts itself to such an extent that I have omitted therefrom all means for manual adjustment except such as applied to the adjustment of the automatic tensioning members.

In the accompanying drawing:—Figure 1 shows my improved mechanism in end elevation and in the position taken when feeding light grain, the operating parts being shown in dotted lines. Fig. 2 is a cross section through the separator to which my feeding mechanism is applied showing the position taken by said mechanism when feeding heavy grain. Figs. 3 and 4 are perspective views of details of the mechanism shown in Figs. 1 and 2.

In the separate views the same part is designated by the same reference character.

Referring more particularly to the drawings, 1 indicates a grain separator having my improved feeding device applied thereto. 2 indicates a hopper into which the grain and straw are fed and which is provided with a downwardly inclined fixed hopper board 3. Opposite the fixed board 3 is a downwardly inclined conveyer or draper belt 4, the belt 4 and the board 3 forming the inclined bottom of the hopper and are spaced apart at their lower end so as to provide a feed aperture 5 through which the grain and straw is fed. The draper belt 4 passes over a sprocket wheel 6 at its upper end and suitable means, not shown, are provided for driving said wheel 6 and the belt 4. The lower end of the belt 4 runs over a sprocket wheel 7 which is pivoted at the end of two arms such as 8, one of which is shown in Fig. 4. The two arms 8 are pivoted at points such as 9 so that the wheel or rollers 7 may rise or lower according to the weight of the grain being fed. The arms 8 are attached to springs 10, the upper ends of which are fixed to bolts 11 which pass through fixed brackets 12, and threaded nuts 13 are provided which are adapted to adjust the bolts 11 in the brackets 12 so as to adjust the tension on the springs 10, and consequently the normal position of the rollers 7 and draper belt 4.

Referring more particularly to Fig. 4, it will be seen that the arms 8 comprise a hollow sleeve section such as $8^a$ which is provided at one end with a flattened portion having an aperture 14 therein adapted to receive pivoting means. The other end of the portion $8^a$ is open and threaded to receive a threaded rod portion 18′ which is provided with an eye 15 in which the rollers 7 may be pivoted. Carried by the portion $8^a$ is also a strap 16 provided with a hole 17 by which the strap and arms may be attached to the lower end of the spring 10.

Disposed beneath the board 3 is a grate 18 shown in perspective in Fig. 3. The grate 18 is carried on cleats 19 which are fastened to the walls which support the hopper 2 and is adapted to slide horizontally on said cleats. The grate 18 is connected on one edge to two links such as 20—20 which are pivoted to the grate by means of hinges 21—21 and which are connected at the other end to arms or levers 22 which are rigid with a shaft 23 which is revolubly mounted beneath the hopper 2. At one end the shaft 23 carries a bell lever or crank arm 24 which is pivotally connected on one end to a rod 25, the latter being connected in turn to a lever 26 which is pivoted to the frame of the machine at 27.

28 is a link which connects the lever 26 to the spring 29, the latter being connected in turn to a threaded rod 30 which passes through a bracket 31.

32 is a take up wrench which is threaded over the rod 30 at the end outside the bracket 31 so that the rod 30 can be adjusted relatively to the spring 29 in order to vary the tension of the spring on the lever 26 and consequently its effect on the position of the grate 18. It will be seen also that the lever 26 is provided with a plurality of holes 33 either of which is adapted to receive the end of the link or rod 25 so that the effect of the spring 29 can be adjusted by shifting the end of the rod 25 relatively to the lever 26 as well as by adjusting the tension of the spring 29 by the rod 30. It will be seen that the spring 29 normally tends to throw the grate 18 into the position shown in Fig. 1 in which it projects beyond the lower edge of the board 3 toward the draper belt 4 so as to restrict the opening 5. However, it will be understood that heavy grain tends to push the grate 18 back into the position shown in Fig. 2 from which it will be seen that the heavy grain increases the opening 5 in two ways, both by pushing down the belt 4 and also by pushing back the grate 18. It will be understood that the grate 18 is made as shown instead of in a solid piece so that any grain which may work down under the board 3 will drop down onto the apparatus adapted to receive the grain which passes through the opening 5.

Immediately below the grate 18 is a distributing cylinder 34 which is designed to distribute the grain evenly across the entire breadth of the draper belt or conveyer 35. It will be understood that the belt 35 feeds the grain direct to the separating cylinder but that my invention does not relate to the separating cylinder it is not shown or described herein. It will be seen also that the draper 35 and draper box 36 are shown in the drawings the same as those in my prior case above mentioned, but no claim is made to these features in this application.

It will be seen that with the construction above described absolutely no time need be taken by the operator to make adjustments and allowances for the different weights of the stuff which is being passed through.

Having thus described my invention, what I claim is:—

1. Automatic feeding apparatus for grain separators comprising in combination, an inclined hopper board, a draper belt inclined oppositely to said hopper board and forming a feeding space with said hopper board, said belt being mounted for bodily pivotal movement about its upper end, and spring means adapted to hold said belt in position to provide a minimum feeding space when the belt is unloaded.

2. Automatic feeding apparatus for grain separators comprising in combination, an inclined hopper board, a draper belt inclined oppositely to said hopper board and forming a feeding space with said hopper board, said belt being mounted for bodily pivotal movement about its upper end, and spring means adapted to hold said belt in position to provide a minimum feeding space when the belt is unloaded, a traveling grate adapted to project into said feeding space beneath the lower edge of said hopper board, and spring means adapted to project said grate relatively farther into said space when light grain is being fed.

3. Automatic feeding apparatus for grain separators comprising in combination, an inclined hopper board, a draper belt inclined oppositely to said hopper board, and forming a feeding space with said hopper board, said belt being mounted for bodily pivotal movement about its upper end, spring means adapted to hold said belt in position to provide a minimum feeding space when the belt is unloaded, a throttle grate mounted beneath the lower edge of said hopper board and adapted to project into said space, cleats on which said grate is mounted, a link hinged to said grate, an arm pivoted to said link, a shaft rigid with said arm, and spring actuated means attached to said shaft adapted to project said grate into said feeding space.

4. Automatic feeding apparatus for grain separators comprising in combination, an inclined hopper board, a draper belt inclined oppositely to said hopper board and forming a feeding space with said hopper board, said belt being mounted for bodily pivotal movement about its upper end, spring means adapted to hold said belt in position to provide a minimum feeding space when the belt is unloaded, a throttle grate mounted beneath the lower edge of said hopper board and adapted to project into said space, a link hinged to said grate, an arm pivoted to said link, a shaft rigid with said arm, spring actuated means attached to said shaft adapted to project said grate into said feeding space, said means comprising a bell lever rigid with said shaft, a ring pivoted to said lever, a second lever pivoted to said link and provided with a plurality of apertures adapted to receive the same, a spring attached to said last mentioned lever, and means for adjusting the tension of said spring.

In testimony whereof I affix my signature in the presence of two witnesses.

WILLIAM CLYDE LEONARD.

Witnesses:
HAROLD SCANTLEBURY,
EDNA BROYLES.